United States Patent
Kang

(10) Patent No.: US 9,102,365 B2
(45) Date of Patent: Aug. 11, 2015

(54) VEHICLE BODY REINFORCING STRUCTURE

(71) Applicant: Hyundai Motor Company, Seoul (KR)

(72) Inventor: SeungMin Kang, Busan (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/332,149

(22) Filed: Jul. 15, 2014

(65) Prior Publication Data

US 2015/0166121 A1 Jun. 18, 2015

(30) Foreign Application Priority Data

Dec. 16, 2013 (KR) .......................... 10-2013-0156667

(51) Int. Cl.
*B62D 21/15* (2006.01)
*B62D 25/20* (2006.01)

(52) U.S. Cl.
CPC .................................. *B62D 25/2036* (2013.01)

(58) Field of Classification Search
CPC ..... B62D 25/2036; B62D 25/20; B62D 27/023
USPC .......... 296/187.08, 209, 193.06, 204, 203.03, 296/205, 30
IPC ....................................................... B62D 21/15
See application file for complete search history.

(56) References Cited

U.S. PATENT DOCUMENTS

| | | | | | |
|---|---|---|---|---|---|
| 2,597,837 | A | * | 5/1952 | Lindsay | 296/181.4 |
| 5,352,011 | A | * | 10/1994 | Kihara et al. | 296/203.03 |
| 5,820,204 | A | * | 10/1998 | Masuda et al. | 296/187.12 |
| 6,416,117 | B1 | * | 7/2002 | Weiman | 296/204 |
| 6,824,200 | B2 | * | 11/2004 | Tomita | 296/187.08 |
| 6,932,405 | B2 | * | 8/2005 | Nakagawa et al. | 296/29 |
| 6,971,709 | B2 | * | 12/2005 | Haewoong | 296/203.04 |
| 7,520,563 | B1 | * | 4/2009 | An et al. | 296/204 |
| 7,753,437 | B2 | * | 7/2010 | Klimek | 296/187.08 |
| 7,963,588 | B2 | * | 6/2011 | Kanagai et al. | 296/187.12 |
| 2008/0106119 | A1 | * | 5/2008 | Ma et al. | 296/187.12 |
| 2012/0086238 | A1 | * | 4/2012 | Tan | 296/209 |
| 2013/0049408 | A1 | * | 2/2013 | Kurogi et al. | 296/209 |

FOREIGN PATENT DOCUMENTS

| | | |
|---|---|---|
| JP | 2005-306192 A | 11/2005 |
| JP | 2010-042771 A | 2/2010 |
| JP | 2010-120525 A | 6/2010 |
| JP | 2011-201470 A | 10/2011 |
| KR | 20-1998-0027197 U | 8/1998 |

* cited by examiner

*Primary Examiner* — Pinel Romain
(74) *Attorney, Agent, or Firm* — Morgan, Lewis & Bockius LLP

(57) ABSTRACT

A vehicle body reinforcing structure may include a center pillar which may be provided at each central portion of left and right sides of a vehicle body, an outside member which is disposed outside the center pillar and surrounds the center pillar, an underside member which is disposed under the center pillar and coupled to a lower end of the center pillar and a lower end of the outside member, a cross member which may be elongated at an upper side of the underside member in a lateral direction of the vehicle body, and an upper side member which may be elongated in the longitudinal direction of the vehicle body and inserted between the underside member and the cross member.

7 Claims, 2 Drawing Sheets

VEHICLE BODY REINFORCING STRUCTURE

CROSS-REFERENCE TO RELATED APPLICATION

The present application claims priority to and the benefit of Korean Patent Application No. 10-2013-0156667 filed on Dec. 16, 2013, the entire contents of which is incorporated herein for all purposes by this reference.

BACKGROUND OF THE INVENTION

1. Field of the Invention

The present invention relates to a vehicle body reinforcing structure, and more particularly, to a vehicle body reinforcing structure for increasing rigidity of a vehicle body.

2. Description of Related Art

In general, shock-absorbing performance refers to performance that mitigates impact force that occurs when two objects collide.

Recently, stability performance has attracted attention, among items of performance of a vehicle. The stability performance includes shock-absorbing performance at the time of a vehicle collision. In addition, the shock-absorbing performance is a major part of determining marketability of the vehicle. Of course, devices such as airbags and seat belts are used to mitigate impact transmitted to occupants at the time of a vehicle collision. However, the shock-absorbing performance of a vehicle body needs to be improved prior to improving performance of safety devices.

Particularly, in order to improve the shock-absorbing performance regarding a load that is applied to a lateral side of the vehicle, it is necessary to increase rigidity of a center pillar and side members connected with the center pillar, and connection structures between vehicle body constituent elements, which easily disperse loads, are required.

Here, the center pillars are columns that are installed at central portions of left and right sides of the vehicle so as to support a roof, and hold doors. In addition, members, which constitute lateral sides of the vehicle body from a front body to a quarter panel, are collectively referred to as the side members. Typically, among the side members, a side member, which is installed perpendicular to a longitudinal direction of the vehicle, is called a cross member, and a side member, which is installed in a forward and rearward direction, is called a side member. Further, the cross member is used to prevent torsion of the vehicle body, and increase rigidity of the vehicle body.

Meanwhile, in the case of the connection structure in the related art in which the side member and the cross members, which are connected with the center pillar, are coupled to the center pillar using flanges, the side member and the cross member may not be rigidly connected to the center pillar, and may not easily disperse a load that is transmitted to the center pillar.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vehicle body reinforcing structure for easily dispersing a load that is transmitted to a center pillar.

Further, various aspects of the present invention are directed to providing a vehicle body reinforcing structure for increasing torsion stress of a vehicle body.

In an aspect of the present invention, a vehicle body reinforcing structure may include a center pillar which is provided at each central portion of left and right sides of a vehicle body to support a roof, an outside member which is disposed outside the center pillar and surrounds the center pillar, an underside member which is disposed under the center pillar and coupled to a lower end of the center pillar and a lower end of the outside member, wherein the underside member is elongated in a longitudinal direction of the vehicle body, a cross member which is elongated at an upper side of the underside member in a lateral direction of the vehicle body, wherein the cross member is coupled to the center pillars at the left and right sides of the vehicle body, and an upper side member which is elongated in the longitudinal direction of the vehicle body and inserted between the underside member and the cross member.

The underside member is formed in a 'U' shape that is opened toward the outside member, and coupled to the outside member to form a box shape.

The upper side member may include an under beam and an upper beam that are formed in an 'L' shape, respectively, wherein a first surface of the under beam is in surface contact with the center pillar, and a second surface of the under beam is in surface contact with an upper surface of the 'U'-shaped underside member.

The first surface of the upper beam is in surface contact with the cross member that is directly coupled to the center pillar, wherein the 'L'-shaped under and upper beams are coupled so that the upper side member forms the box shape.

The cross member may include a vertically extended portion that protrudes vertically and is extended up to the underside member while passing by the upper side member, wherein the upper side member is inserted into a box-shaped space that is surrounded by the cross member, the vertically extended portion, the center pillar, and the upper surface of the underside member.

The vehicle body reinforcing structure may include a cross section which is formed to have at least two box shapes.

The cross member may include a vertically extended portion that protrudes vertically and is extended up to the underside member while passing by the upper side member, wherein the upper side member is inserted into a box shaped space that is surrounded by the cross member, the vertically extended portion, the center pillar, and the upper surface of the underside member.

The upper side member may include an under beam and an upper beam that are formed in an 'L' shape, respectively, wherein the 'L'-shaped under and upper beams are coupled so that the upper side member forms a box shape.

As described above, according to the exemplary embodiment of the present invention, the cross member is directly connected to the center pillar, and the upper side member is inserted between the cross member and the center pillar, such that the load being transmitted to the center pillar may be easily dispersed.

In addition, the side members form at least two box structures, thereby increasing torsion stress of the vehicle body.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
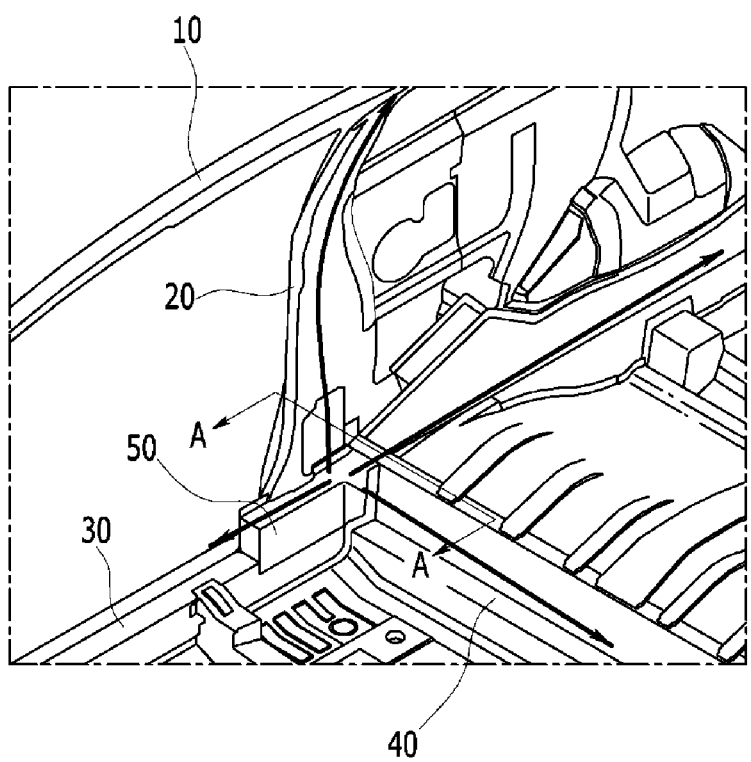
FIG. 1 is a perspective view of a vehicle body reinforcing structure according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a perspective view of a vehicle body reinforcing structure according to an exemplary embodiment of the present invention.

As illustrated in FIG. 1, a vehicle body reinforcing structure according to an exemplary embodiment of the present invention includes a center pillar 20, an outside member 10, an underside member 30, a cross member 40, and an upper side member 50.

The center pillars 20 are installed at central portions of left and right sides of a vehicle, and serve as columns that support a roof, and hold doors. Because the center pillar 20 is obvious to those skilled in the technical field to which the present invention pertains (hereinafter, referred to as those skilled in the art), a more detailed description thereof will be omitted.

The outside member 10 is a constituent element of a vehicle body which is disposed outside the center pillar 20 to surround the center pillar 20. Further, upper ends of the outside member 10 are extended toward both sides on the basis of the center pillar 20 in a longitudinal direction of the vehicle. In addition, the outside member 10, which is extended toward both sides in the longitudinal direction, is coupled to the roof that is an upper closure of the vehicle body. Meanwhile, the outside member 10 may be formed integrally with a quarter panel of the vehicle body.

The underside member 30 is connected with a lower end of the center pillar 20, and a lower end of the outside member 10. Further, the underside member 30 is extended in the longitudinal direction of the vehicle from a front body to the quarter panel of the vehicle body.

Here, because the roof, the front body, and the quarter panel are obvious to those skilled in the art, a more detailed description thereof will be omitted.

The cross member 40 is mounted perpendicular to the longitudinal direction of the vehicle. Further, the cross member 40 is formed to connect the underside members 30 that are provided at both lateral sides of the vehicle. That is, the cross member 40 is extended in a lateral direction of the vehicle from the underside member 30 provided at one side of the vehicle to the underside member 30 provided at the other side of the vehicle.

The upper side member 50 is disposed at an upper side of the underside member 30. Further, the upper side member 50 is coupled to an upper end of the underside member 30 and the center pillar 20. In addition, the upper side member 50 is extended in the longitudinal direction of the vehicle from the center pillar 20 to the quarter panel. Meanwhile, the cross member 40 connects the upper side members 50 that are provided at both lateral sides of the vehicle. That is, the cross member 40 is extended in the lateral direction of the vehicle from the underside member 30 and the upper side member 50, which are provided at one side of the vehicle, to the underside member 30 and the upper side member 50 which are provided at the other side of the vehicle. Further, a part of the cross member 40 is extended to pass by the underside member 30 and the upper side member 50, and coupled to the center pillar 20.

In FIG. 1, directions in which loads are applied to the center pillar 20 in the lateral direction of the vehicle, and directions in which loads being applied to the center pillar 20 are dispersed are indicated by arrows.

A part of the load being applied to the center pillar 20 is dispersed upward and downward along the center pillar 20, and another part of the load is transmitted to the underside member 30, the upper side member 50, and the cross member 40. Further, a part of the loads being transmitted to the underside member 30 and the upper side member 50 through the center pillar 20 is dispersed toward both sides in the longitudinal direction of the vehicle along the underside member 30 and the upper side member 50, and another part of the loads is transmitted to the cross member 40. In addition, the load being transmitted to the cross member 40 through the center pillar 20, the underside member 30, and the upper side member 50 is dispersed in the lateral direction of the vehicle along the cross member 40.

Figure 2:
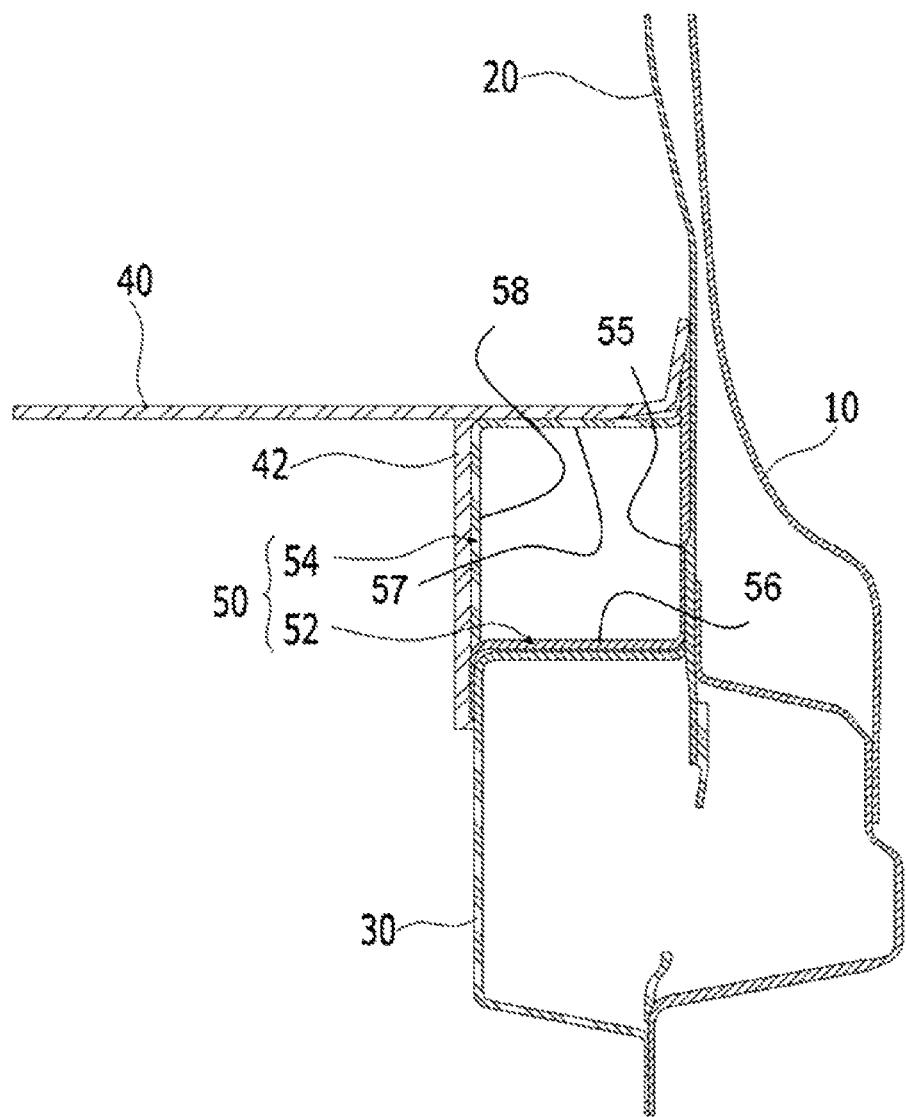
FIG. 2 is a cross-sectional view taken along line A-A of FIG. 1.

FIG. 2 is a cross-sectional view taken along line A-A of FIG. 1.

As illustrated in FIG. 2, the upper side member 50 includes an under beam 52, and an upper beam 54, and the cross member 40 includes a vertically extended portion 42.

Meanwhile, a cross section of the underside member 30 is formed in a 'U' shape that is opened toward the outside member 10, and coupled to the lower end of the outside member 10 so as to form a hollow box shape.

A cross section of the under beam 52 is formed in an 'L' shape. Further, one surface 56 of the 'L'-shaped under beam 52 is in surface contact with an upper surface of the 'U'-shaped underside member 30. In addition another surface 55 of the 'L'-shaped under beam 52 is in surface contact with the center pillar 20.

The upper beam 54 is disposed at an upper side of the under beam 52. Further, a cross section of the upper beam 54 is formed in an 'L' shape. In addition, one surface 57 of the 'L'-shaped upper beam 54 is in surface contact with the part of the cross member 40 which is extended to pass by the upper side member 50 so as to be coupled to the center pillar 20.

The vertically extended portion 42 vertically protrudes downward from an upper portion of the cross member 40. Further, the vertically extended portion 42 passes by the upper side member 50, and is extended up to the underside member 30. Meanwhile, another surface 58 of the 'L'-shaped upper beam 54 is in surface contact with the vertically extended portion 42. That is, the vertically extended portion 42 is in surface contact with and coupled to the upper beam 54 of the upper side member 50 and the underside member 30.

Therefore, the entire cross section of the upper side member 50 is formed in a hollow box shape. That is, the 'L'-shaped under beam 52 and the 'L'-shaped upper beam 54 are coupled to form a box shape. Further, the upper side member 50, which is formed in a hollow box shape, is inserted into a box-shaped space that is surrounded by the upper portion of the cross member 40, the vertically extended portion 42 of the cross member 40, the center pillar 20, and the upper surface of the underside member 30.

Meanwhile, the center pillar 20, the outside member 10, the underside member 30, the cross member 40, and the upper side member 50 may be coupled by welding such as spot welding.

As described above, according to the exemplary embodiment of the present invention, the cross member 40 is directly connected to the center pillar 20, and the upper side member 50 is inserted between the cross member 40 and the center pillar 20, such that the load being transmitted to the center pillar 20 may be easily dispersed. Further, the side members 10, 30, and 50 form at least two box structures, thereby increasing torsion stress of the vehicle body.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle body reinforcing structure comprising:
a center pillar which is provided at each central portion of left and right sides of a vehicle body to support a roof;
an outside member which is disposed outside the center pillar and surrounds the center pillar;
'U'-shaped underside member which is disposed under the center pillar and coupled to a lower end of the center pillar and a lower end of the outside member, wherein the underside member is elongated in a longitudinal direction of the vehicle body;
a cross member which is elongated at an upper side of the underside member in a lateral direction of the vehicle body, wherein the cross member is directly coupled to the center pillars at the left and right sides of the vehicle body; and
an upper side member which is elongated in the longitudinal direction of the vehicle body and inserted between the underside member and the cross member,
wherein the upper side member includes an under beam and an upper beam, each formed in an 'L' shape,
wherein a first surface of the under beam is in surface contact with the center pillar, and a second surface of the under beam is in surface contact with an upper surface of the 'U'-shaped underside member,
wherein the first surface of the upper beam is in surface contact with the cross member that is directly coupled to the center pillar, and
wherein each of the 'L'-shaped under and upper beams are coupled so that the upper side member forms a box shape.

2. The vehicle body reinforcing structure of claim 1, wherein
the 'U'-shaped underside member is formed in a 'U' shape opened toward the outside member, and coupled to the outside member to form the box shape.

3. The vehicle body reinforcing structure of claim 1, wherein the cross member includes a vertically extended portion that protrudes vertically and is extended up to the underside member while passing by the upper side member, and
wherein the upper side member is inserted into a box-shaped space that is surrounded by the cross member, the vertically extended portion, the center pillar, and the upper surface of the underside member.

4. The vehicle body reinforcing structure of claim 1, comprising:
a cross section which is formed to have at least two box shapes.

5. The vehicle body reinforcing structure of claim 1, wherein the cross member includes a vertically extended portion that protrudes vertically and is extended up to the underside member while passing by the upper side member, and
wherein the upper side member is inserted into a box shaped space that is surrounded by the cross member, the vertically extended portion, the center pillar, and the upper surface of the underside member.

6. The vehicle body reinforcing structure of claim 1, wherein the upper side member includes an under beam and an upper beam that are formed in an 'L' shape, respectively, and
wherein the 'L'-shaped under and upper beams are coupled so that the upper side member forms a box shape.

7. The vehicle body reinforcing structure of claim 1, wherein the cross member includes a vertically extended portion to which a second surface of the upper beam is in surface contact.

* * * * *